United States Patent Office 3,028,856
Patented Apr. 10, 1962

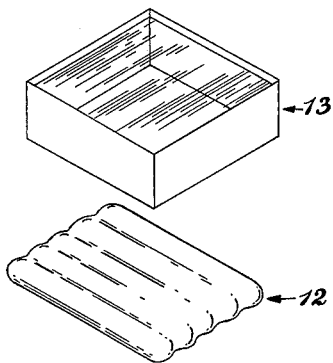
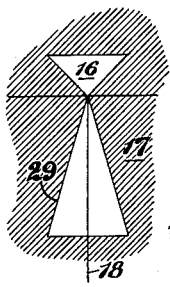
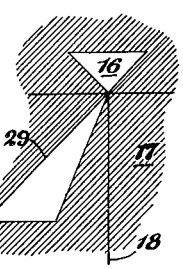
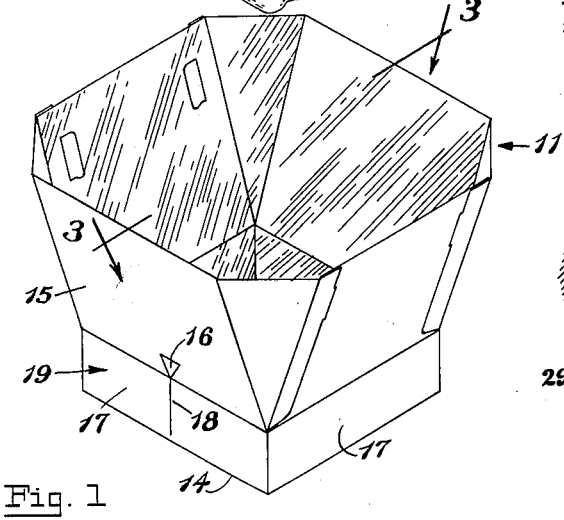
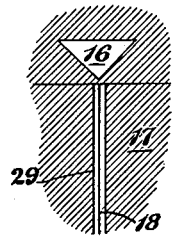
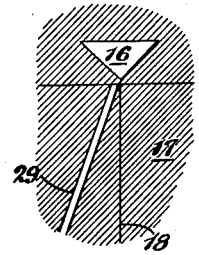
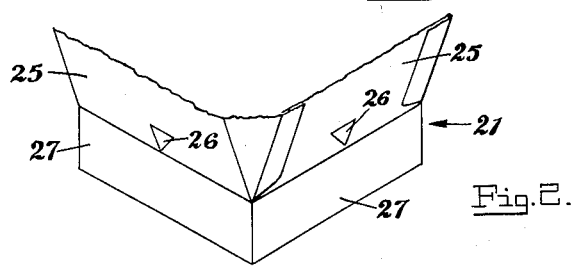
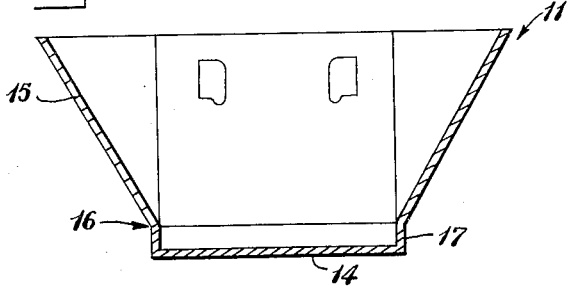

3,028,856
AIMING MEANS FOR A SOLAR HEATER
Deall Daymon, Levittown, Pa., assignor to Curtiss-Wright Corporation, a corporation of Delaware
Filed Apr. 24, 1959, Ser. No. 808,607
8 Claims. (Cl. 126—270)

This invention relates to a new and improved means for orienting a solar heater properly with respect to the incident solar radiation.

This application is a continuation-in-part of my copending application No. 782,196, filed December 22, 1958, and assigned to the assignee of the present application.

When using solar heaters, such as the container described in the aforementioned copending patent application, for example, it is important to so orient the solar heater in the incident sunlight that the solar radiation falling upon the reflective surfaces is concentrated on the object to be heated within the body portion of the solar heater.

Accordingly, it is an object of this invention to provide means for determining the orientation of a solar heater with respect to the incident solar radiation.

It is a further object of this invention to provide means whereby the direction in which a solar heater is aimed with respect to the incident solar radiation may be readily determined, which determination may be utilized in readily repositioning a solar heater so as to maximize the concentration of solar energy therein.

A still further object of the present invention is to provide such an aiming means which may be readily and inexpensively incorporated into the solar heater construction.

With the above objects in mind, the present invention mainly comprises means incorporated into the solar heater construction for casting a shadow upon a predetermined portion of the solar heater surface whereby the appropriateness of the orientation with respect to the incident solar radiation may be readily observed.

The novel features which are considered as characteristic of the invention are set forth in particular in the appended claims. The invention, itself, however, both as to its construction and its method of operation, together with additional objects and advantages thereof, will be best understood from the following description of specific embodiments when read with the accompanying drawings, in which:

FIGURE 1 is a perspective exploded view of a solar heater embodying the principles of this invention;

FIGURES 1A, 1B, 1C, and 1D illustrate some of the light-shadow appearances of the solar heater of FIGURE 1 in various orientations;

FIGURE 2 is a perspective view, partly broken away, of another embodiment of a solar heater utilizing the principles of this invention; and FIGURE 3 is a sectional view taken along the lines 3—3 of FIGURE 1.

Referring to the drawings and more particularly to the embodiment illustrated in FIGURE 1 and FIGURE 3, there is shown a solar heater food container 11 of the type described in the aforesaid patent application Serial No. 782,196, adapted to contain and to heat food package 12. The solar heater 11 includes a body portion 19 having a base 14 and side portions 17. The heater 11 further includes reflector means 15. When being utilized for heating food package 12, the food package is placed within heater 11, and is covered by one or more layers of transparent film-like material contained in cover means 13.

The detailed construction of solar heater 11 and the importance of properly orienting it with respect to the incident solar radiation is explained in copending application No. 782,196. The reflector portion 15 of the solar heater is arranged to maximize the concentration of the solar radiation on the food package when the base 14 of the solar heater is arranged substantially perpendicular to the incident solar radiation. The present invention relates to the means whereby such proper orientation may readily be determined and achieved.

Incorporated in the reflector portion 15 of solar heater 11 is a triangular hole 16 appropriately positioned so that when the incident solar radiation impinges upon solar heater 11 perpendicular to the base 14 of the solar heater, the beam of sunlight streaming through the hole 16 falls upon the external surface of side portion 17 along the line 18. Line 18 is printed on side portion 17 perpendicular to the base 14 of the solar heater.

Should the solar heater be positioned improperly with respect to the incident solar radiation, the beam of sunlight streaming through hole 16 will present one of the following appearances; a triangular patch of light on side 17 (FIGURES 1A and 1B); a line angling to the right or the left of printed line 18 (FIGURE 1C); or no light on side 17 at all. It is relatively easy to reposition the solar heater when any of these effects are noticed so as to produce the desired result; i.e., a thin line of light substantially coinciding with the printed line 18 (FIGURE 1D). In each of FIGURES 1A, 1B, 1C, 1D, numeral 29 represents the shadow edge dividing the portion of side 17 illuminated by the beam of sunlight streaming through hole 16 from the remainder of side 17 which is in the shadow of reflector portion 15.

It is thus seen that an aiming device for a solar heater container has been provided which requires only a relatively small hole appropriately positioned in the reflector means and a printed line or other indicia perpendicular to the base of the solar heater.

Referring next to the embodiment shown in FIGURE 2, there is shown a solar heater 21 of a type similar to solar heater 11 of FIGURE 1. In two of the reflector means 25 are located orifices 26 appropriately positioned to cast shadow edges upon sides 27 when the solar heater is appropriately positioned within the field of incident solar radiation. Since the two beams of sunlight from the two orifices 26 fall on two sides 27 which are perpendicular to each other, it is not necessary for a printed line to be provided on the surface of sides 27.

Should the solar heater be improperly oriented with respect to the incident solar radiation, the beam of sunlight from either one or both of the orifices 26 will display one of the following conditions; a triangular patch of sunlight on side 27; or the sunlight will entirely miss side 27. When solar heater 21 is properly oriented within the field of incident solar radiation, the beams of sunlight streaming through the two orifices 26 will each produce a thin line of light on the mutually perpendicular sides 27 approximately as illustrated in FIGURE 1D.

It is thus seen that this embodiment also provides a ready means for determining and adjusting the orientation of solar heater 21.

While the embodiments shown have both been utilized on unitary construction solar heating food packages, it is obvious that this technique for producing a ready indication of the orientation of the solar heater with respect to the incident solar radiation can readily be adapted for use also on larger, more complex solar heaters. It is further apparent that while the shape of the holes forming an integral part of the aiming mechanism are shown as triangular in shape, other shapes, such as circular or rectangular obviously could be used.

Without further analysis, the foregoing will so fully reveal the gist of the present invention that others can, by applying current knowledge, readily adapt it for various applications and modes of manufacture without omitting features that, from the standpoint of prior art, fairly constitute essential characteristics of the generic or specific aspects of this invention, and therefore, such adaptions should be and are intended to be comprehended within the meaning and range of equivalents of the following claims.

What is claimed as new and desired to be secured by Letters Patent is:

1. A solar heater comprising in combination: an open container having a bottom and substantially vertical sidewalls; and reflector means attached to and diverging outwardly from said side walls for reflecting incident solar radiation into said open container, said reflector means being provided with an orifice at the junction of said reflector means and a side wall so that when said solar heater is oriented with the periphery of the bottom of said container perpendicular to incident solar radiation a beam of sunlight passes through said orifice producing a thin line of light impinging along a sidewall and perpendicular to the bottom of said container, said side wall having indicia thereon along the path of said line of light produced on said side wall.

2. A solar heater comprising in combination: an open container having a bottom and substantially vertical sidewalls, at least two of said sidewalls being adjacent and perpendicular to one another; and reflector means attached to and diverging outwardly from said side walls for reflecting incident solar radiation into said open container, said reflector means being provided with an orifice at the juncture of each of said adjacent side walls and said reflector means whereby a beam of sunlight passes through each of said orifices and produces a thin line of light that impinges on each of said adjacent side walls when said solar heater is oriented with the periphery of the bottom of said container perpendicular to incident solar radiation.

3. A solar heater comprising in combination; an open container having a bottom and substantially vertical sidewalls; and reflector means attached to and diverging outwardly from said sidewalls for directing solar radiation into said open container, said reflector means having an axis perpendicular to the perimeter of said bottom of said open container and having at least one cutout section therein at the juncture of said reflector means and a side wall to permit at least a beam of said incident solar radiation to impinge upon a preselected area of a sidewall of said open container thereby indicating the orientation of said solar heater with respect to said incident solar radiation.

4. A solar heater comprising in combination; an open container having a bottom and substantially vertical sidewalls, one of said sidewalls having indicia thereon; and reflector means attached to and diverging outwardly from said sidewalls for reflecting incident solar radiation into said open container, said reflector means having an orifice therein at the juncture of said reflector means and said side wall having indicia thereon whereby a thin line of sunlight is passed along said sidewall having indicia thereon in a pre-selected relationship with said indicia when said solar heater is oriented with said side walls of said open container parallel with said incident solar radiation.

5. In a solar heater in combination; an open container having a bottom and four substantially vertical sidewalls; and reflector means attached to and diverging outwardly from said four sidewalls for directing solar radiation into said open container, said reflector means having an axis parallel to incident solar radiation when said bottom of said open container is positioned perpendicular to said incident solar radiation, a portion of said side walls being within the shadow cast by said reflector means when said axis of said reflecting means is parallel with incident solar radiation, said reflector means further having at least one cutout section therein, at the juncture of said reflector means and a side wall whereby a beam of sunlight impinges upon a side wall of said open container whereby the orientation of said solar heater with respect to said incident solar radiation is indicated.

6. A solar heater as defined in claim 1 wherein said orifice is triangular in shape.

7. A solar heater as defined in claim 2 wherein said orifices are triangular in shape.

8. Apparatus as claimed in claim 5 wherein said surface of said sidewall has indicia thereon in a preselected relationship to said beam of incident solar radiation when the solar heater is properly oriented.

References Cited in the file of this patent

UNITED STATES PATENTS

| | | |
|---|---|---|
| 497,079 | Severy | May 9, 1893 |
| 696,326 | De La Garza | Mar. 25, 1902 |
| 1,479,923 | Moreau | Jan. 8, 1924 |